Dec. 29, 1942.　　M. RONNING　　2,306,755
DRIVING MECHANISM FOR COMBINES
Filed Oct. 25, 1941　　2 Sheets-Sheet 1
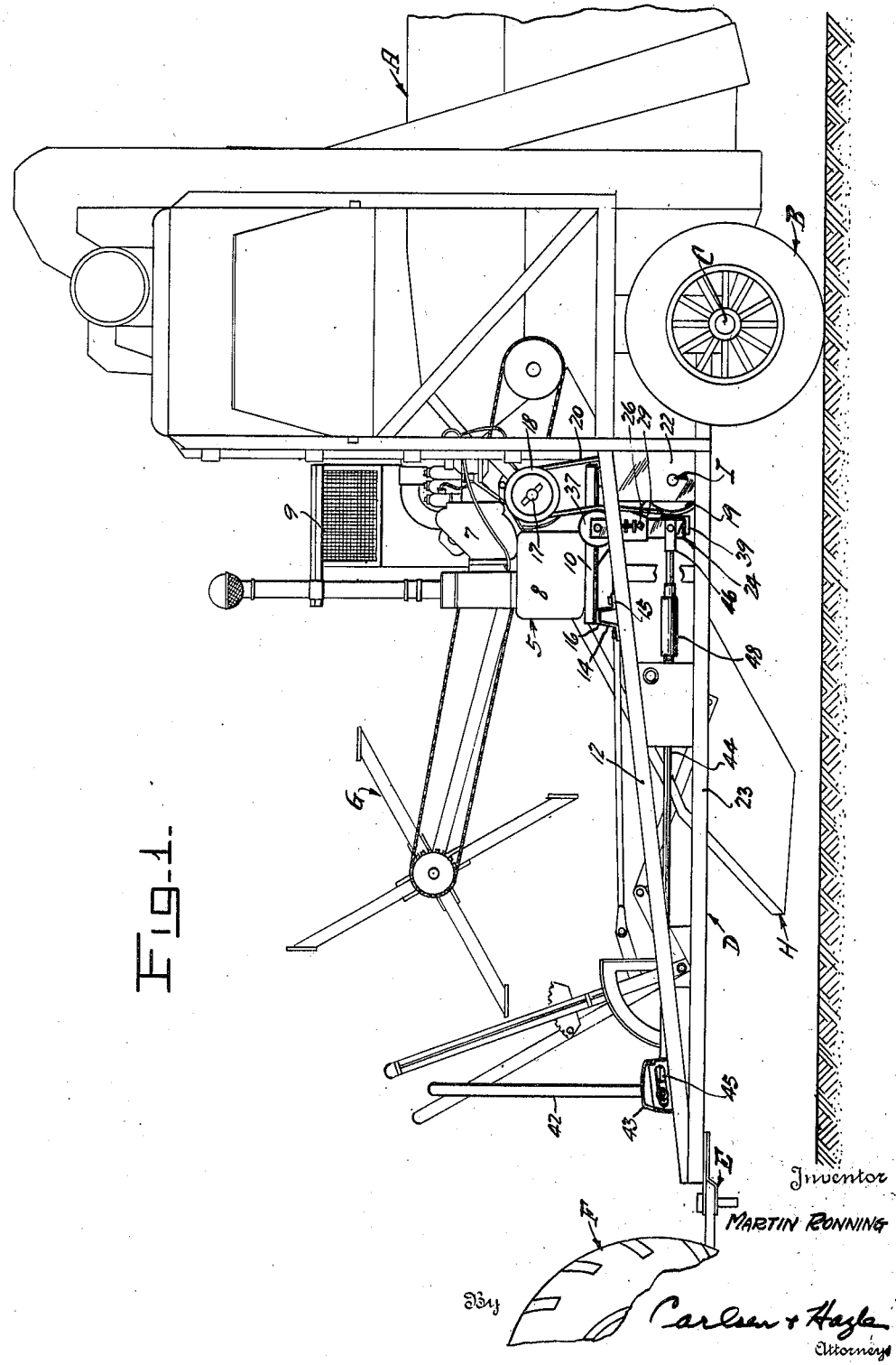
Inventor
MARTIN RONNING
By Carlsen & Hagle
Attorneys

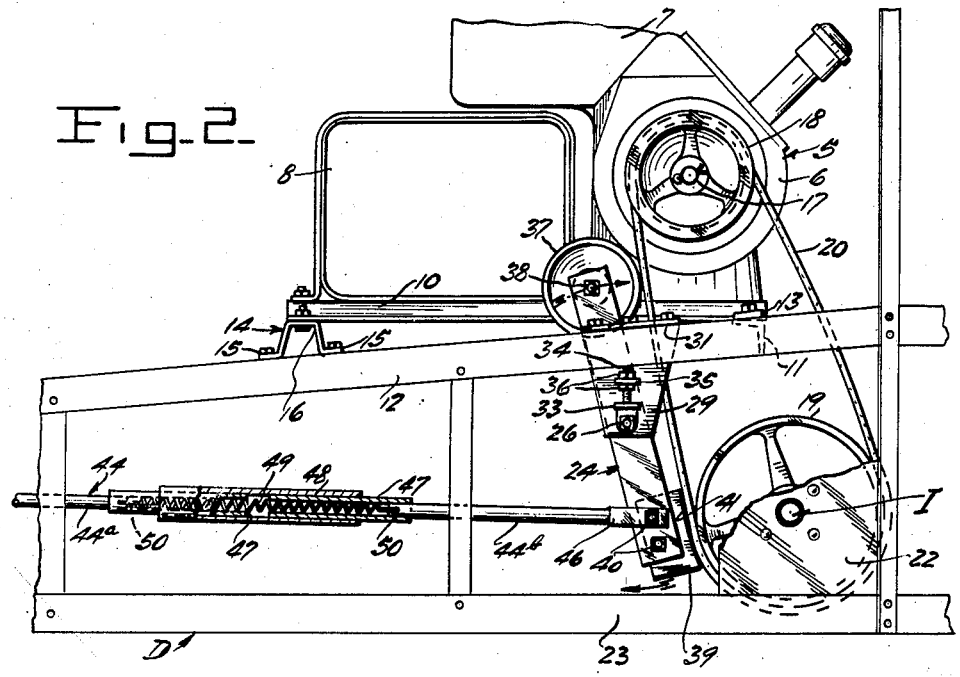

Patented Dec. 29, 1942

2,306,755

UNITED STATES PATENT OFFICE 2,306,755

DRIVING MECHANISM FOR COMBINES

Martin Ronning, St. Louis Park, Minn., assignor to Minneapolis-Moline Power Implement Company, Minneapolis, Minn., a corporation of Delaware Application October 25, 1941, Serial No. 416,519

2 Claims. (Cl. 192—11)

This invention relates generally to improvements in driving mechanisms for combines and more specifically to an engine mounting and belt tightening assembly for such implements.

The invention finds particular application to the popular small "one-man" combines which are pulled behind a tractor, controlled by the tractor operator from his seat on the tractor, and which are frequently operated by connection to the power take-off of the tractor. In some cases it is desirable to provide the combine with its own power unit or engine and with suitable controls therefore arranged convenient to hand of the tractor operator. The capacity of the combine is thus greatly increased and the tractor engine is relieved of the work of driving working parts of the combine, but the advantages of one man operation and control are retained.

The primary object of the invention therefore is to provide a simple and practical engine mounting for such combines with belt connection to working parts of the combine and a belt tightener having forwardly located control means by which the belt may be tightened or loosened to effectively connect or disconnect the engine from said working parts. Another object is to provide a belt tightener mechanism for combines having means for applying braking forces to driven parts as the belt is loosened, when it is desired to stop the working parts of the combine quickly. Still another object is to provide means arranged to limit the forces which may be applied to the belt either for tightening the same, or applying brake friction thereto, to thus prevent injury to the belt.

With these and other objects in view the invention resides in the novel construction and arrangement of parts as hereinafter set forth and claimed, reference being had to the accompanying drawings wherein:

Figure 1 is a side elevation, with a rear portion broken away, showing a combine having my engine mounting and belt tightener mechanism embodied therein.

Figure 2 is a fragmentary, enlarged side elevation of the mechanism constituting my invention.

Figure 3 is a fragmentary vertical cross section through frame parts of the combine and showing the mechanism of Figure 2 in frontal elevation.

Figure 4 is an elevational view of the belt tightener detached from other parts.

For convenience in disclosure the drive and control mechanism of my present invention is shown as arranged on a combine of the type shown in greater detail in my copending application for patent on Combine, Serial No. 313,831 filed January 15, 1940, now Patent No. 2,266,805, dated Dec. 23, 1941.

This type of combine comprises a body A supported mainly by wheels B at each end of a transverse axle C and having a forwardly extending tongue or draft frame D which is hitched at E to the tractor F for draft purposes. The connection of the tongue frame to the tractor of course balances the combine on its ground wheels B so that no tongue truck is needed.

To drive the various working parts of the combine, such as the cylinder, fan, grain pan, straw racks and conveyors in the body A, the reel G and the cutter located forwardly at H, I provide herein a countershaft I which is suitably arranged and connected to such parts. Such connections are not here detailed since they form no part of the present invention and are subject to variation according to the particular arrangement and construction of the combine itself.

In accordance with my invention I provide a power unit or engine 5 which may be of any conventional form and which as here shown includes a crankcase 6, cylinder block 7, fuel tank 8, and cooling system 9, all compactly arranged upon a base made up of longitudinal channels 10. These channels are bolted at rear ends upon a rear cross bar 11 which extends between the spaced upper members 12 of the tongue frame D and is supported therein by clips 13 (Figures 2 and 3). The forward ends of the channels 10 are bolted upon a front cross bar on frame member 14 which is secured at its ends upon said member 12 as clearly shown. The tongue members 12 slope forwardly and to level the power unit base this forward cross bar 14 is channel-shaped having base or mounting flanges 15 secured to the tongue frame and an upwardly arched center portion 16 to which the channels 10 are bolted.

The power unit is thus readily removable from the combine merely by removing the bolts mounting the channels 10 as will be understood. The mounting is so located that the power unit is immediately forward of the wheels B to thus so far as possible remove "neck weight" from the tongue D and obviate the necessity for a tongue truck.

The crankshaft 17 of the power unit extends in parallelism with, and above, countershaft I and a drive pulley 18 is secured on the crankshaft in alignment with a driven pulley 19 placed on the countershaft. A belt 20 is then trained over the two pulleys to cause the power unit to rotate the countershaft and drive the aforesaid operating parts connected thereto. The countershaft 1 may be supported at its ends in bearings 21 secured to plates 22 which, in turn, are attached to the tongue frame in upright positions between the upper members 12 and corresponding lower members 23 thereof.

My belt tightening device comprises a frame or carrier member, designated generally at 24, which is arranged adjacent to and in the plane of one span or reach of the belt 20, being here shown as disposed forwardly of the belt. This member 24 comprises a pair of side bars 25 which are connected in spaced parallel relation by a mounting pin or bolt 26 passed through their center portions (Figure 4) and with a sleeve 27 arranged between the bars to hold them at proper spacing. The ends of the bolt 26 are received in inner and outer bracket 28 and 29 which thus support the entire frame member 24 for opposite swinging or oscillating movements at its upper and lower ends, in upright longitudinal planes, toward and away from the belt. Said inner bracket 28 includes a horizontal flange 30 bolted to the engine base channels 10 and a depending upright portion which is apertured to receive the inner end of bolt 26. The outer bracket 29 is spaced properly from the inner to receive the frame 24 and is supported by an outwardly turned flange 31 which is bolted to the outer and upper tongue frame member 12. Here, however, the outer end of the bolt 26 passes through a vertically elongated slot 32 in the bracket and is received in a clip 33 rigidly carried at the lower end of the stud 34. This stud extends through an ear 35 secured to the bracket 29 and by adjusting the nuts 36 it will be evident that the outer end of bolt 26 may be raised or lowered with respect to the inner end. As a result the entire frame device 24 may be angled to bring its ends into proper alignment with the belt 20.

An idler pulley or roller 37 is journaled between the upper ends of the side bars 25 upon a pin 38 mounted therethrough and the parts are so located and arranged that this pulley may engage the belt 20 just below the drive pulley 18. Obviously by urging the upper end of the tightener frame 24 rearwardly, or toward the belt, this idler pulley will tighten the belt 20 (which of course hangs loosely when free) and cause the power unit 5 to positively drive the countershaft 1 and connected combine parts.

A brake block or shoe 39, preferably of wood or similar non-metallic material, is mounted between lower ends of the side bars 25 by means of cross bolts 40 and on the working face or side next to the bolt this block may be arcuately formed or concaved as represented at 41. This block is so located that movement of the lower end of frame 24 toward the belt, which will swing the idler pulley 37 clear, will, if continued, move the face 41 against the belt where it passes around the driven pulley 19. The force thus exerated will result in a frictional braking action such as to quickly stop the operation of working parts of the combine when desired.

To thus operate the belt tightener I provide a hand lever 42 which is mounted by a slotted bracket 43 upon the forward end portion of the tongue frame D so that it is conveniently located for manipulation by the tractor operator from his seat on said tractor. A control rod 44 is rigidly connected at a forward end 45 to this hand lever and, running therefrom rearwardly in the tongue frame, is connected at its rear end 46 to the tightener frame 24, as by placing said end on one of the bolts 40. Obviously movement of the hand lever 42 in one direction will now pull on rod 44 to swing the idler pulley 37 into tightening engagement with the belt while opposite movement will push on the rod to swing the idler pulley clear and engage the brake block 39.

The control rod 44 actually is comprised of front and rear sections 44a and 44b which are disposed in axial alignment and spaced slightly apart at adjacent ends as best seen in Figure 2. These ends are secured in short inner sleeves or pieces of tubing 47 which, in turn, are slidably telescoped into a larger outer sleeve 48. A coil spring 49 has its ends secured at 50 to the ends of the rod sections 44a—44b. The sleeves coact to hold the rod sections in alignment while permitting limited relative endwise movements thereof. When thus arranged any excessive movement or force exerted on the hand lever 42 will cause the spring 49 to expand or contract, as the case may be, thus absorbing compressional or tensional forces on the rod such as might either tighten the belt, or apply the brake thereto, to an injurious or destructive degree.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. Driving mechanism for a combine including pulleys and a connecting belt, a belt tightener comprising a frame member supported intermediate its ends for opposite swinging movements at its ends toward and away from one span of the belt, an idler pulley at one end of the frame device, a brake device at the other end thereof, and means for angling the frame device to align both the idler pulley and brake device with the belt.

2. In a combine operating mechanism including pulleys and a belt thereon, a belt tightener device comprising a frame having belt engaging means at opposite ends, a pin oscillatably supporting a central part of the frame in a manner permitting opposite swinging movements of the frame ends toward and away from the belt, bracket members for supporting said pin, and means on one bracket member for adjusting the pin and angling the frame in a plane at right angles to the plane in which its ends swing about said pin.

MARTIN RONNING.